(12) United States Patent
Komatsu

(10) Patent No.: US 8,422,117 B2
(45) Date of Patent: Apr. 16, 2013

(54) ELECTROPHORETIC DISPLAY AND ELECTRONICS DEVICE

(75) Inventor: Harunobu Komatsu, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 68 days.

(21) Appl. No.: 13/233,631

(22) Filed: Sep. 15, 2011

(65) Prior Publication Data
US 2012/0113499 A1    May 10, 2012

(30) Foreign Application Priority Data

Nov. 5, 2010   (JP) ................... 2010-248727

(51) Int. Cl.
G02B 26/00   (2006.01)
G09G 3/34    (2006.01)

(52) U.S. Cl.
USPC .......................................... 359/296; 345/107

(58) Field of Classification Search .......... 359/296; 345/107; 430/32, 34, 38; 204/450, 600
See application file for complete search history.

(56) References Cited

U.S. PATENT DOCUMENTS

| 8,130,441 B2 * | 3/2012 | Frazier et al. ................. 359/296 |
| 2003/0011869 A1 | 1/2003 | Matsuda et al. |
| 2003/0016429 A1 | 1/2003 | Ikeda et al. |

FOREIGN PATENT DOCUMENTS

| JP | A-2003-5225 | 1/2003 |
| JP | A-2003-5226 | 1/2003 |
| JP | A 2004-4773 | 1/2004 |
| JP | A-2010-91908 | 4/2010 |
| WO | WO 01/67170 A1 | 9/2001 |

* cited by examiner

*Primary Examiner* — Ricky Mack
*Assistant Examiner* — Tuyen Tra
(74) *Attorney, Agent, or Firm* — Oliff & Berridge, PLC

(57) ABSTRACT

An electrophoretic display includes a first substrate and a second substrate; base portions which are provided in a display area on the first substrate such that any two mutually adjacent ones of the base portions are disposed so as to have an interspace therebetween; reflection plates which are provided on upper surfaces of the base portions, respectively; first electrodes which are overlapped with the reflection plates, respectively; second electrodes which are provided in the interspaces on the first substrate so as to correspond to the first electrodes, respectively; a sealing member which is provided between the first and second substrates so as to enclose the display area; and dispersion liquid which is provided between the first and second substrates, and which includes a dispersion medium, and electrophoretic particles dispersed in the dispersion medium, the electrophoretic particles having a color different from the reflection plate.

12 Claims, 10 Drawing Sheets

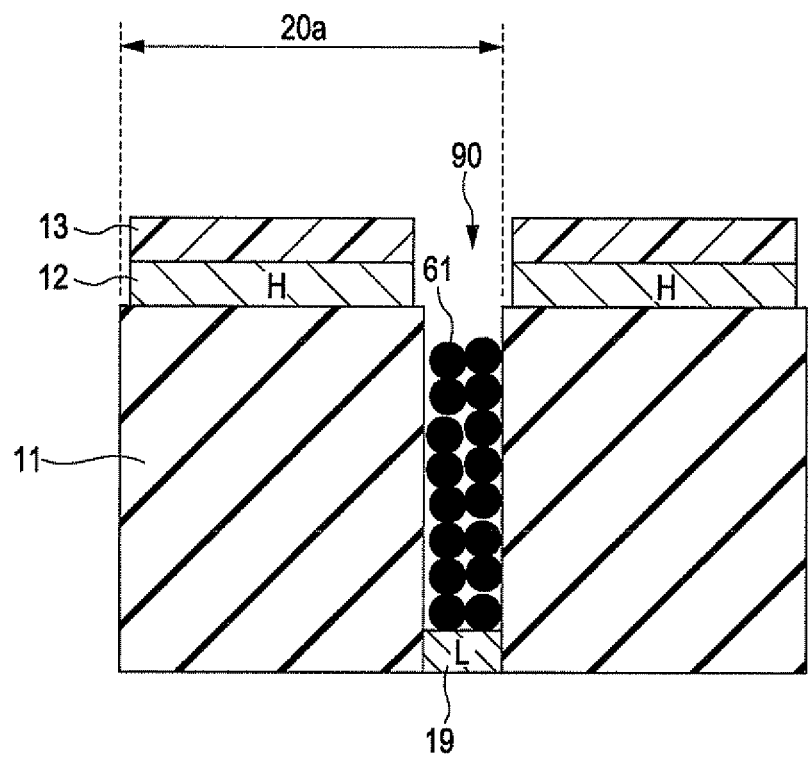
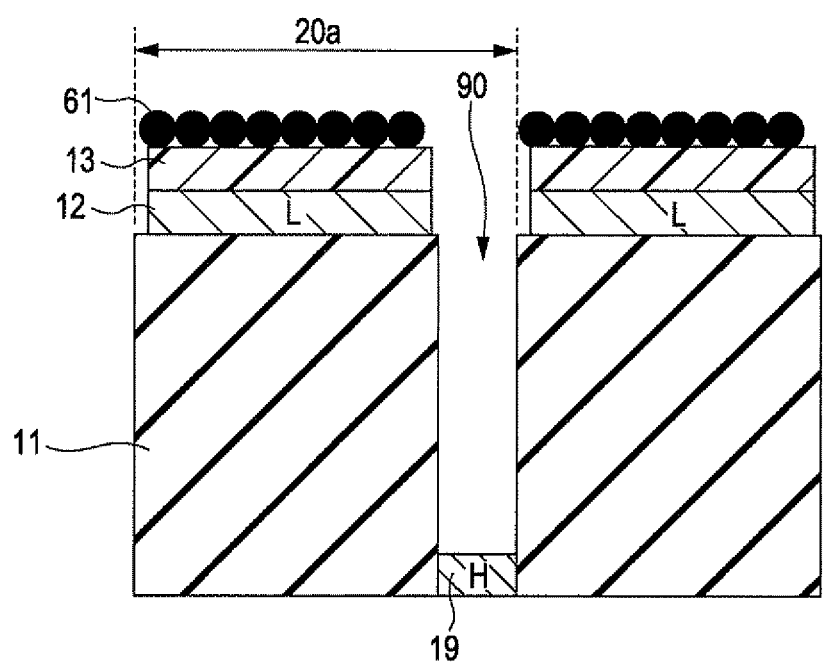

ELECTROPHORETIC DISPLAY AND ELECTRONICS DEVICE

BACKGROUND

1. Technical Field

The present invention relates to a technical field regarding an electrophoretic display and an electronics device.

2. Related Art

Known examples of this kind of an electrophoretic display (EPD) includes an electrophoretic display provided therein with electrophoretic dispersion liquid which is obtained by dispersing electrophoretic particles in a dispersion medium, and which is sealed between a pair of substrates (for example, refer to JP-A-2010-91908, JP-A-2003-5226 and JP-A-2003-5225). For example, an electrophoretic display, which is disclosed in JP-A-2010-91908, includes white-color electrophoretic particles and black-color electrophoretic particles (hereinafter, which will be arbitrarily called "white particles" and "black particles", respectively) dispersed in a dispersion medium, these two kinds of electrophoretic particles being electrically charged and having mutually different polarities, and causes voltages to be supplied between pixel electrodes provided on one substrate and opposing electrodes provided on the other substrate. This electrophoretic display causes the white particles and the black particles to move to mutually different substrate sides by supplying an appropriate voltage between each pair of the pixel electrode and the opposing electrode; thereby enabling realization of displaying images on a display surface thereof. Moreover, for example, an electrophoretic display, which is disclosed in JP-A-2003-5226 and JP-A-2003-5225, includes black particles dispersed in a dispersion medium; a first display electrode provided so as to be along a lower surface of a stair portion which is formed for each of pixels on one substrate; a second display electrode so as to along an upper surface of the stair portion; an area which includes the first display electrode formed therein, and which is colored in black color; and an area which includes the second display area, and which is colored in white color. This electrophoretic display causes the black particles to move so as to cover the first display electrode or the second electrode by supplying an appropriate voltage between each pair of the first display electrode and the second display electrode; thereby enabling realization of displaying black color of white color for each pixel. Moreover, this electrophoretic display further includes a partition wall member which is disposed so as to enclose the peripheries of individual pixels, and which prevents movement of electrophoretic particles across borders between mutually adjacent pixels.

Among the above-described electrophoretic displays, for example, for the electrophoretic display disclosed in JP-A-2010-91908, for example, a smaller thickness of a white-particle layer formed of a plurality of white particles, which have moved to the opposing electrode side when required to display white color on a display surface, leads to more difficulty in allowing the white-particle layer to sufficiently cover the black particles, and thus, is likely to result in making it difficult to display the white color. Therefore, in order to realize high-quality display, it is necessary to, when required to display white color on the display surface, increase the thickness of the white-particle layer to a degree sufficient to cover the black particles having moved to the pixel electrode side. For this reason, there is a technical problem in that it is difficult to shorten a distance between the opposing electrode and the pixel electrode (in other words, a distance between the pair of substrates), and thus, in order to allow the white particles and the black particles to move sufficiently, there is no choice other than making the level of a voltage to be supplied between the opposing electrode and the pixel electrode be relatively high. Moreover, there is also a technical problem in that, increasing the number of the white particles in order to increase the thickness of the white-particle layer for displaying white color on a display surface leads to a larger particle concentration of particles dispersed in the electrophoretic dispersion liquid, and thus, is likely to result in lowering moving speeds with which the electrophoretic particles move in the dispersion liquid upon supply of an appropriate voltage between the opposing electrode and the pixel electrode.

Further, among the above-described electrophoretic displays, for example, for the electrophoretic display disclosed in JP-A-2003-5226 and JP-A-2003-5225, there is a technical problem in that the partition wall member, which is disposed so as to enclose the peripheries of individual pixels, leads to reduction of an effective display area, in which displaying can be effectively performed, by an area of a portion in which the partition wall member is disposed, and thus, is likely to result in a difficulty in realization of high-quality display.

SUMMARY

An advantage of some aspects of the invention is to provide an electrophoretic display which enables realization of high-quality display, and an electronics device provided therein with such an electrophoretic display.

An electrophoretic display according to a first aspect of the invention includes a first substrate and a second substrate which are disposed opposite each other; a plurality of base portions which are provided in a display area on the first substrate such that any two mutually adjacent ones of the base portions are disposed so as to have an interspace therebetween; a plurality of reflection plates which are provided on upper surfaces of the plurality of base portions, respectively; a plurality of first electrodes which are provided so as to be covered by the plurality of reflection plates, respectively, when seen in a plan view from above the first substrate; a plurality of second electrodes which are provided in the interspaces on the first substrate so as to correspond to the plurality of first electrodes, respectively; a sealing member which is provided between the first substrate and the second substrate so as to enclose the display area; and dispersion liquid which is provided in the display area between the first substrate and the second substrate, and which includes a dispersion medium, and electrophoretic particles dispersed in the dispersion medium, the electrophoretic particles having the same color which is different from a color of the reflection plate.

The electrophoretic display according to the first aspect of the invention includes the dispersion liquid, which is provided inside the display area between the first substrate and the second substrate, and which includes electrophoretic particles, each having, for example, black color, dispersed in the dispersion medium. The electrophoretic particles are dispersed in the dispersion medium in a positively or negatively charged condition. Further, the sealing member is provided between the first substrate and the second substrate so as to enclose the display area. The sealing member has a function of sealing an area between the first substrate and the first substrate so as to prevent leakage of the dispersion liquid from the area between the first substrate and the second substrate. The plurality of base portions is provided inside the display area on the first substrate such that any two mutually adjacent ones of the base portions have an interspace (i.e., a slit) therebetween. The plurality of base portions is arrayed, for example, in a matrix shape inside the display area. In other words, the plurality of base portions is provide so as to correspond to the respective plurality of pixels, which is arrayed, for example, in a matrix shape, inside the display area. For example, the interspace, which is provided between any two mutually adjacent ones of the plurality of base portions, has a lattice-like planar shape when seen in a plan view from above the first substrate. On an upper surface of each of the plurality of base portions, a pair of a reflection plate having, for example, white color, and the first electrode is provided. Moreover, the second substrate is provided in the interspace between any two mutually adjacent ones of the base portions on the first substrate. Typically, the second electrode is provided so as to be along a bottom surface of the interspace (i.e., the slit) between any two mutually adjacent ones of the base portions. The second electrode is provided so as to correspond to the first electrode, and is located in the interspace adjacent to the base portion on which the first electrode corresponding to the second electrode is provided.

Further, the electrophoretic display according to the first aspect of the invention enables realization of high-quality display inside the display area by supplying appropriate voltages in accordance with, for example, image signals between the first electrodes and the second electrodes corresponding thereto.

Specifically, by supplying an appropriate voltage between the first electrode and the second electrode so as to cause the electrophoretic particles, each having, for example, black color, to move to the first electrode side, it is possible to cause the electrophoretic particles, each having, for example, black color, to cover the reflection plate having, for example, white color. Therefore, it is possible to, for each of the first electrodes (in other words, for each of the pixels) inside the display area, display the color (for example, black color) of the electrophoretic particles. Further, by supplying an appropriate voltage between the first electrode and the second electrode so as to cause the electrophoretic particles, each having, for example, black color, to move to the second electrode side, it is possible to cause the electrophoretic particles, each having, for example, black color, to be contained in the interspace between any two adjacent base portions, and expose the reflection plate having, for example, white color. Therefore, it is possible to, for each of the first electrodes (in other words, for each of the pixels) inside the display area, display the color of the reflection plate (for example, white color).

According to the first aspect of the invention, both of the first electrode and the second electrode are provided on the first substrate, and thus, it is possible to make the level of a voltage supplied between the first electrode and the second electrode be relatively small.

Moreover, according to the first aspect of the invention, only one kind of electrophoretic particles, such as black particles (i.e., electrophoretic particles each having black color) are dispersed in the dispersion liquid, and thus, compared with a case in which, for example, black particles and white particles are dispersed in dispersion liquid, it is possible to lower the concentration of the electrophoretic particles in the dispersion liquid, and thus, it is possible to increase a moving speed with which the electrophoretic particles move in the dispersion liquid (in other words, a response speed of electrophoretic particles in response to supply of an appropriate voltage). As a result, it is possible to increase a display speed with which display contents are updated.

In addition, according to the first aspect of the invention, by forming the reflection plate so as to cause the reflection plate to have white color, it is possible to display the white color inside the display area with certainty. Here, even though the electrophoretic particles each having, for example, black color are contained in an interspace between two mutually adjacent base portions, the reflection plate having white color is capable of scattering light rays in multiple directions, and thus, displaying has very few improper influences or no practical improper influence from the color of the black particles (the improper influences being, for example, degradation of brightness, degradation of contrast, and the like).

As described above, the electrophoretic display according to the first aspect of the invention enables realization of high-quality display.

In the first aspect, preferably, the electrophoretic display further includes a driving unit configured to perform a refresh driving such that, regarding the first and second electrodes, which form a plurality of rows each including pairs of the first electrode and the second electrode, the pairs being arrayed along a side of the first substrate, a process, in which, for the respective pairs of the first electrode and the second electrode included in at least one of the rows, voltages are supplied between the first electrodes and the second electrodes so that aggregates of the electrophoretic particles move from first electrode sides to second electrode sides, is iteratively performed, the at least one of the rows, for an initial process, being an initial one of the rows, which is located closest to the side of the first substrate, and for subsequent processes, being successive ones of the rows, which, for each of the subsequent processes, is increased by one row which is disposed at a position opposite to the side of the first substrate, in addition to at least one of the rows, which has been processed in an immediately previous process.

In this case, for example, in the case where a plurality of electrophoretic particles is unevenly distributed around the side of the first substrate, the refresh driving performed by the driving unit enables elimination of the uneven distribution of the plurality of electrophoretic particles. That is, the refresh driving performed by the driving unit enables realization of an even distribution of the plurality of electrophoretic particles all over the display area.

In the first aspect, preferably, the first electrode includes a body portion which is provided so as to be along an upper surface of the base portion, and a side portion which is provided so as to extend from the body portion toward the first substrate along a side surface of the base portion, and the reflection plate is provided on the body portion.

In this case, a distance between the upper surface of the reflection plate and the electrophoretic particles having been contained in the interspace because of an appropriate voltage having been supplied between the first electrode and the second electrode can be made larger than a length by which the side portion extends along the side surface of the base portion. Therefore, when required to display the color of the reflection plate, it is possible to reduce or prevent occurrence of a situation in which, as a result, the color of the electrophoretic particles is exposed to be viewed. In addition, an appropriate voltage, which has been supplied between the first electrode and the second electrode so that the electrophoretic particles move to the second electrode side, causes repulsive forces between the side surface portion of the first electrode and the electrophoretic particles, and this repulsive forces enable reduction or prevention of occurrence of a situation in which the electrophoretic particles result in movement to the reflection plate side (in other words, the body portion side of the first electrode).

In the first aspect, preferably, the reflection plate is provided on the first electrode, and an adjustment film formed of a transparent material is provided on the reflection plate.

In this case, it is possible to cause the electrophoretic particles to be contained in the interspace with certainty by supplying an appropriate voltage between the first electrode and the second electrode so that the electrophoretic particles move to the second electrode side. That is, in this case, compared with an assumed case in which the adjustment film is not provided on the reflection plate, since the depth of the interspace can be made larger by a film thickness of the adjustment film, it is possible to reduce or prevent occurrence of a situation in which the electrophoretic particles required to be contained in the interspace result in movement to positions covering the reflection plate when seen in a plan view from above the first substrate. Thus, when required to display the color of the reflection plate, it is possible to reduce or prevent occurrence of a situation in which, as a result, the color of the electrophoretic particles is viewed.

In the first aspect, preferably, a total volume of the electrophoretic particles corresponding to the first electrode is smaller than a volume of the interspace corresponding to the first electrode.

In this case, it is possible to cause the electrophoretic particles to be contained in the interspace with certainty by supplying an appropriate voltage between the first electrode and the second electrode so that the electrophoretic particles move to the second electrode side.

In the first aspect, preferably, the electrophoretic display further includes a partition wall which is provided between the first substrate and the second substrate, and which partitions the display area into a plurality of areas, each including a group of the first electrodes.

In this case, the partition wall provided between the first substrate and the second substrate enables increase of strength against pressure applied from, for example, the first substrate side and/or the second substrate side. Here, particularly, a plurality of the first electrodes is included in each of the plurality of areas partitioned by the partition wall. Therefore, compared with an assumed case in which the partition wall is provided so as to enclose each of the pixels, an area which is occupied by the partition wall (in other words, an area not contributing to displaying) inside the display area can be made smaller, and thus, it is possible to realize bright and high-contrast display.

An electronics device according to a second aspect of the invention includes any one of the above-described electrophoretic display according to the first aspect and the above-described electrophoretic displays in the preferable cases of the first aspect.

The electronics device according to the second aspect of the invention includes any one of the above-described electrophoretic display according to the first aspect and the above-described electrophoretic displays in the preferable cases of the first aspect, and thus, enables realization of various electronics devices each being capable of displaying high-quality images, such as a wrist watch, electronic paper, an electronic notebook, a mobile telephone and a portable audio device.

Operations and other advantages of the invention will be made obvious from exemplary embodiments which will be described hereinafter.

BRIEF DESCRIPTION OF THE DRAWINGS

The invention will be described with reference to the accompanying drawings, wherein like numbers reference like elements.

FIG. 6 is a first diagram describing a principle of display with respect to an electrophoretic display according to a first embodiment of the invention.

FIG. 7 is a second diagram describing a principle of display with respect to an electrophoretic display according to a first embodiment of the invention.

DESCRIPTION OF EXEMPLARY EMBODIMENTS

Hereinafter, embodiments according to the invention will be described with reference to drawings.

First Embodiment

An electrophoretic display according to a first embodiment will be described with reference to FIGS. 1 to 9.

First, an entire configuration of an electrophoretic display according to this embodiment will be described with reference to FIGS. 1 to 4.

Figure 1:
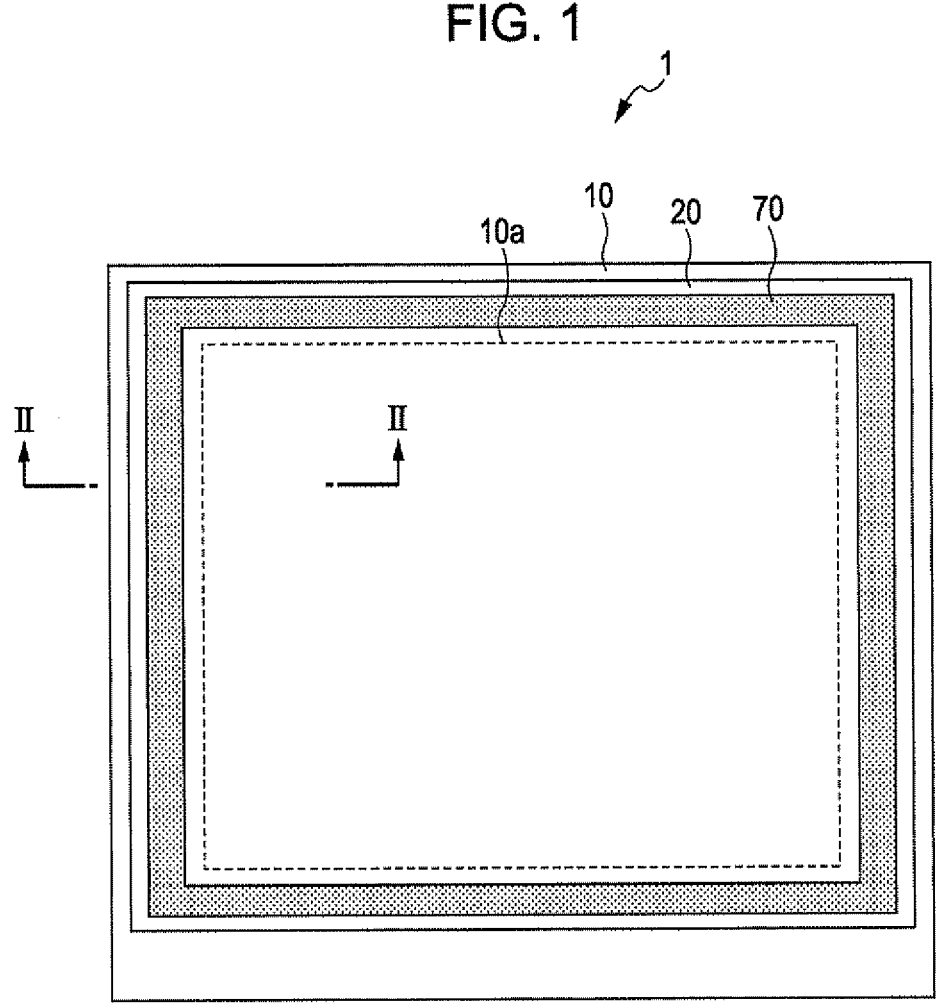
FIG. 1 is a plan view schematically illustrating an entire configuration of an electrophoretic display according to a first embodiment of the invention.
Figure 2:
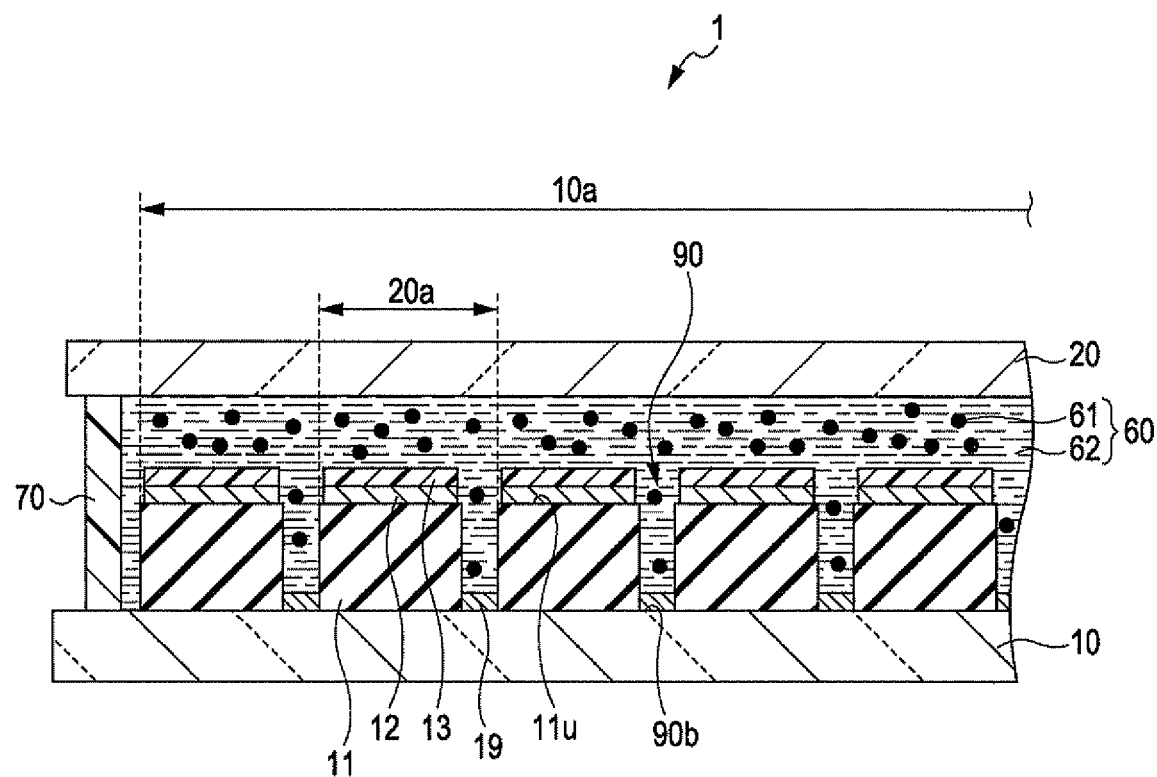
FIG. 2 is a cross-sectional view taken along the line II-II of FIG. 1.

FIG. 1 is a plan view schematically illustrating an entire configuration of an electrophoretic display according to this embodiment. FIG. 2 is a cross-sectional view taken along the line II-II of FIG. 1, and schematically illustrates a configuration of an electrophoretic display according to this embodiment.

In FIGS. 1 and 2, an electrophoretic display 1 according to this embodiment includes a circuit substrate 10 and an opposing substrate 20 which are disposed so as to be opposite each other; dispersion liquid 60 which is provided in a display area 10*a* between the circuit substrate 10 and the opposing substrate 20; and a sealing member 70 which is provided between the circuit substrate 10 and the opposing substrate 20 so as to enclose the display area 10a. In addition, the circuit substrate 10 is an example of "a first substrate" according to some aspects of the invention, and the opposing substrate 20 is an example of "a second substrate" according to some aspects of the invention.

The circuit substrate 10 is a substrate including a planar substrate made of a resin substrate, a glass substrate, or the like, and various circuit elements which are formed on the planar substrate, and are configured to drive a display electrode 12 and a slit electrode 19, which will be described hereinafter.

The opposing substrate 20 is a planar substrate made of a resin material, a glass substrate or the like.

The dispersion liquid 60 is electrophoretic dispersion liquid including a dispersion medium 62 and a plurality of black particles 61 dispersed in the dispersion medium 62.

The black particles 61 are black-color electrophoretic particles taken as an example of "electrophoretic particles" according to some aspects of the invention, and each of the black particles 61 is formed of a material including a black-color pigment, such as an aniline black pigment or a carbon black pigment. The black particles 61 are each dispersed in the dispersion medium 62, for example, in a positively charged condition.

The dispersion medium 62 is a medium for dispersing the black particles 61. With respect to the dispersion medium 62, one of the following liquids can be used singly or in a mixture with any other of the following liquids: water; an alcohol solvent such as methanol, ethanol, isopropanol, butanol, octanol and methyl cellusolve; an ester solvent such as ethyl acetate and butyl acetate; a ketone group such as acetone, methyl ethyl ketone and methyl isobutyl ketone; an aliphatic hydrocarbon such as pentane, hexane and octane; an alicyclic hydrocarbon such as cyclohexane, methyl cyclohexane; benzene; toluene; an aromatic hydrocarbon such as a benzene series having a long-chain alkyl base such as xylene, hexyl benzene, heptyl benzene, octyl benzene, nonyl benzene, decyl benzene, undecylic benzene, dodecyl benzene, tridecyl benzene and tetradecyl benzene; a halogenated hydrocarbon such as methylene chloride, chloroform, carbon tetrachloride and 1.2 dichloroethane; a carboxylate salt; and other types of oils. Further, the dispersion medium 62 may be combined with an surface active agent.

The sealing member 70 is formed of a resin, such as an epoxy resin, a silicon resign, or an acrylic resign. As shown in FIG. 1, the sealing member 70 is provided between the circuit substrate 10 and the opposing substrate 20 so as to enclose the display area 10. The sealing member 70 has a function of sealing an area between the circuit substrate 10 and the opposing substrate 20 so as to prevent leakage of the dispersion liquid 60 from the area between the circuit substrate 10 and the opposing substrate 20. Further, the sealing member 70 has also a function of suppressing intrusion of moisture into the dispersion liquid 60 from outside. Moreover, the sealing member 70 has a function of bonding the circuit substrate 10 and the opposing substrate 20 with each other. In addition, inorganic fine particles, such as silica or alumina, may be dispersed in the resign forming the sealing member 70. In this case, it is possible to suppress intrusion of moisture into the dispersion liquid 60 from outside through the sealing member 70 with more certainty.

Figure 3:
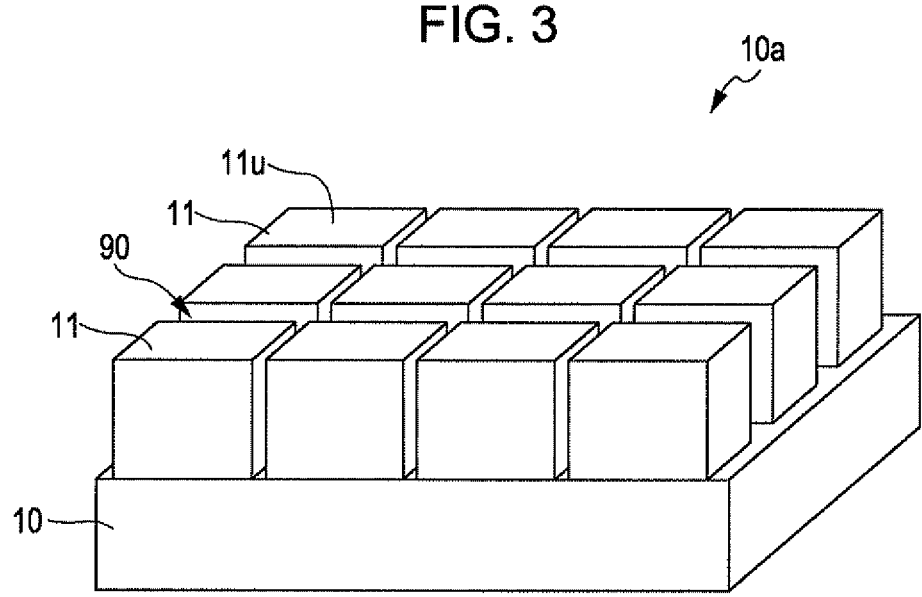
FIG. 3 is a perspective view illustrating a configuration of a plurality of base portions and a slit of an electrophoretic display according to a first embodiment of the invention.

FIG. 3 is a perspective view illustrating a configuration of a plurality of base portions and slits of an electrophoretic display according to this embodiment.

As shown in FIGS. 2 and 3, a plurality of base portions 11 are disposed inside the display area 10a on the circuit substrate 10 such that a slit 90 exists between any two mutually adjacent ones thereof. Each of the plurality of base portions 11 is formed of a resign material, and has a substantially rectangular-solid-like shape. The plurality of base portions 11 is arrayed in a matrix shape inside the display area 10a. In other words, the plurality of base portions 11 is provided so as to correspond to the respective plurality of pixels 20a which are arrayed in a matrix shape inside the display area 10a. The slit 90 is an interspace which is formed between any two mutually adjacent ones of the plurality of matrix-like arrayed base portions 11, and has a lattice-like planar shape when seen in a plan view from above the circuit substrate 10. In addition, for example, the width of the slit 90 is approximately 5 pro, and the depth of the slit 90 is approximately 15 μm.

As shown in FIG. 2, a pair of a display electrode 12 and a white reflection plate 13 is provided on an upper surface 11u of each of the plurality of base portions 11, and a slit electrode 19 is provided at a corresponding bottom surface 90b of the slit 90.

The display electrode 12, which is an example of "a first electrode" according to some aspects of the invention, is formed of a conductive material, such as an aluminum (Al) material. The display electrode 12 is formed so as to substantially overlap the upper surface 11u of the base portion 11. The display electrode 12 has a rectangular planar shape. The display electrode 12 is electrically connected to a circuit element formed on the circuit substrate 10 (specifically, the circuit element being a transistor 72, which will be described below with reference to FIG. 5) via a through-hole (omitted from illustration) formed in the base portion 11.

The white reflection plate 13, which is an example of "a reflection plate" according to some aspects of the invention, is a white-color reflection plate formed of a resign including, for example, white-color pigments (for example, titanium materials) dispersed therein, or the like. The white reflection plate 13 is provided on the display electrode 12, and is formed so as to overlap the display electrode 12. The white reflection plate 13 has a rectangular planar shape just like the display electrode 12.

Figure 4:
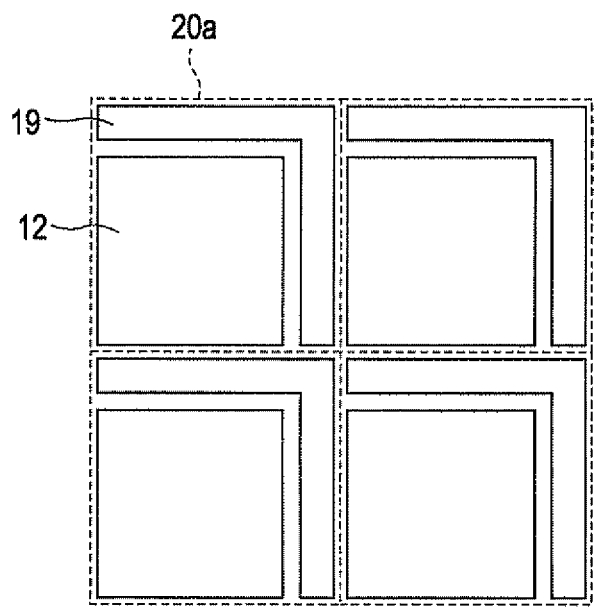
FIG. 4 is a plan view illustrating a configuration of display electrodes and slit electrodes according to a first embodiment of the invention.

FIG. 4 is a plan view illustrating a configuration of the display electrode 12 and the slit electrode 19.

In FIGS. 2 and 4, the slit electrode 19, which is an example of "a second electrode" according to some aspects of the invention, is formed of, for example, a conductive material, such as an aluminum material.

The slit electrode 19 is provided for each of the pixels 20a so as to correspond to the display electrode 12. That is, for each of the plurality of pixels 20a forming the display area 10a, the display electrode 12 and the slot electrode 19 are provided as a pair of electrodes. The slit electrode 19 is provided in a portion of the slit 90, the portion being located adjacent to the base portion 11 having the corresponding display electrode 12 formed thereon. The slit electrode 19 is formed so as to be along two mutually-neighboring sides of the display electrode 12 having a rectangular shape when viewed in a plan view from above the circuit substrate 10, and has a substantially L-like planer shape. In addition, the slit electrode 19 may be configured by a plurality of mutually divided electrode portions.

Next, an electrical configuration of an electrophoretic display according to this embodiment will be described with reference to FIG. 5.

Figure 5:
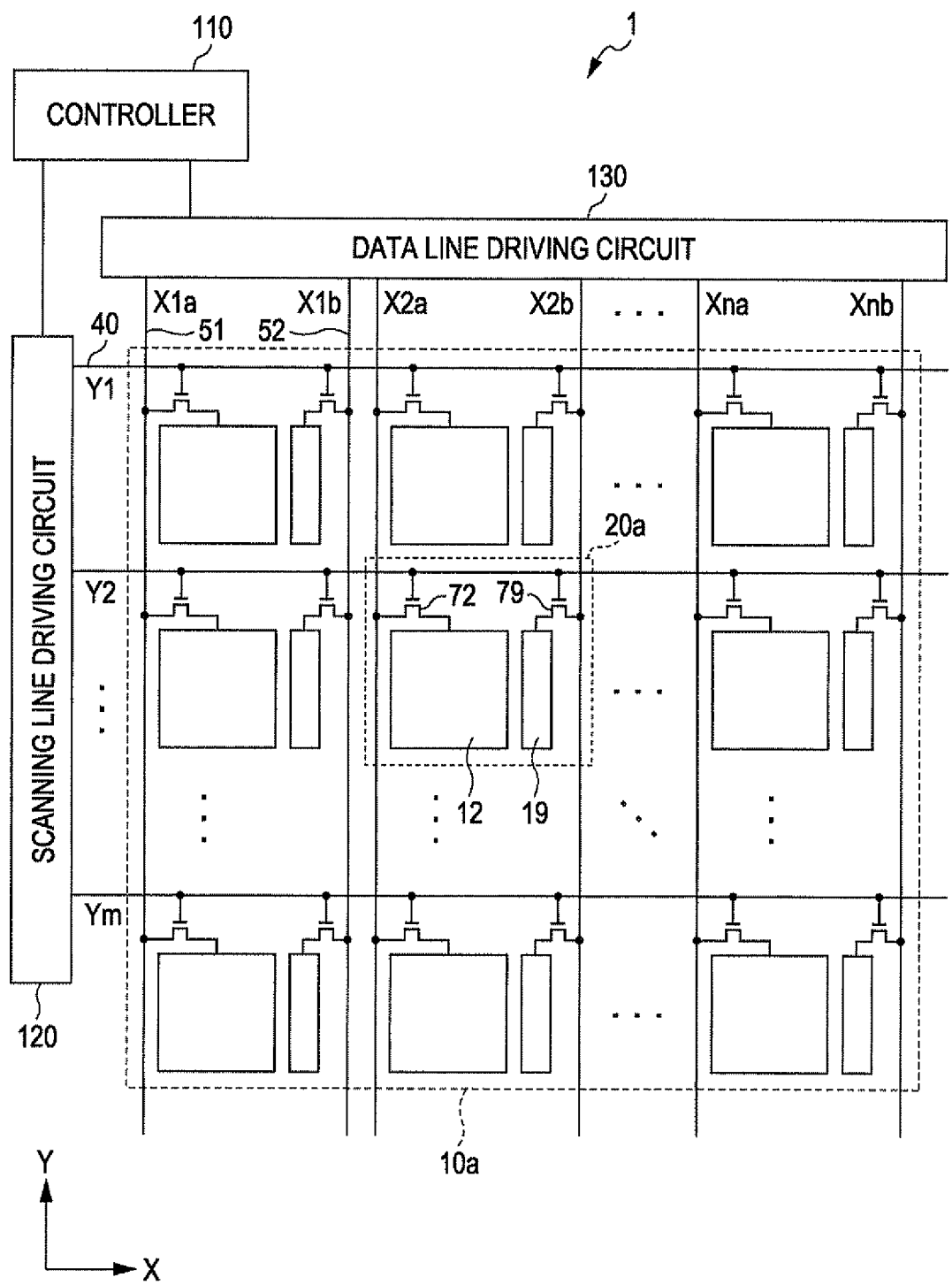
FIG. 5 is a block diagram illustrating an electrical configuration of an electrophoretic display according to a first embodiment of the invention.

Referring to FIG. 5 which is a block diagram illustrating an electrical configuration of an electrophoretic display according to this embodiment, the electrophoretic display 1 includes a controller 110, a scanning line driving circuit 120 and a data line driving circuit 130. In addition, the controller 110, the scanning line driving circuit 120 and the data line driving circuit 130 constitute an example of "a driving unit" according to some aspects of the invention. The controller 110, the scanning line driving circuit 120 and the data line driving circuit 130 are provided in a peripheral portion of the display area 10a on the circuit substrate 10. Inside the display area 10a on the circuit substrate 10, m scanning lines 40 (i.e., scanning lines Y1, Y2, ..., Ym) are provided so as to intersect with n first data lines 51 (X1a, X2a, ..., Xna) and n second data lines 52 (X1b, X2b, ..., Xnb). Specifically, the m scanning lines 40 extend in a row direction (i.e., in an X-axis direction), and both of the n first data lines 51 and the n second data lines 52 extend in a column direction (i.e., in a Y-axis direction). The pixels 20a are located at positions corresponding to intersection points of the m scanning lines 40 and the n first data lines 51, and intersection points of the m scanning lines 40 and the n second data lines 52.

The controller 110 performs control of operations of the scanning line driving circuit 120 and the data line driving circuit 130. Specifically, the controller 110 supplies the scanning line driving circuit 120 and the data line driving circuit 130 with timing signals, such as clock signals and start pulses, and supplies the data line driving circuit 130 with image signals to be supplied to the display electrodes 12.

The scanning line driving circuit 120 sequentially supplies the scanning lines Y1, Y2, ..., Ym with scanning lines in a pulse-like form on the basis of timing signals supplied from the controller 110.

The data lien driving circuit 130 supplies the first data lines X1a, X2a, ..., Xna with image signals on the basis of timing signals supplied from the controller 110. Each of the image signals has one of two-value levels of an electrical potential, one being a high electrical potential level (hereinafter, which will be called "a high level", and corresponds to, for example, 5V), the other one being a low electrical potential level (hereinafter, which will be called "a low level", and corresponds to, for example, 0V). Moreover, the data line driving circuit 130 supplies the second data lines X1b, X2b, ..., Xba with inverted image signals on the basis of timing signals supplied from the controller 110. The inverted image signals are signals resulting from inverting the two-value levels of the corresponding image signals, and, for example, in the case where a certain image signal has a high level, an inverted image signal corresponding to the certain image signal has a low level; while, in the case where a certain image signal has a low level, an inverted image signal corresponding to the certain image signal has a high level. That is, each of the inverted image signals has also two-value levels of the high level and the low level. For example, in the case where a certain image signal has an electrical potential of 15V as the high level and an electrical potential of 0V as the low level, an inverted image signal corresponding to the certain image signal is a signal having polarities resulting from inverting polarities of the certain image signal relative to an electrical potential of 7.5V.

Each of the pixels 20a is provided with the above-described display electrode 12 and slit electrode 19, as well as transistors 72 and 79. The transistor 72 has a gate electrode electrically connected to one of the scanning lines 40, a source electrode electrically connected to one of the first data lines 51, and a drain electrode electrically connected to the display electrode 12. The transistor 79 has a gate electrode electrically connected to one of the scanning lines 40, a source electrode electrically connected to one of the second data lines 52, and a drain electrode electrically connected to the slit electrode 19. During operation of the electrophoretic display 1, the scanning line 40 is supplied with a scanning signal from the scanning line driving circuit 120, so that the transistors 72 and 79 are each in a turned-on condition, thereby causing the display electrode 12 and the first data line 51 to be electrically connected to each other, and further, the slit electrode 19 and the second data line 52 to be electrically connected to each other. As a result of this operation, an image signal is supplied to the display electrode 12 from the first data line 51, and further, an inverted image signal corresponding to the image signal is supplied to the slit electrode 19 from the second data line 52.

Next, an operation principle of an electrophoretic display according to this embodiment will be described with reference to FIGS. 6 and 7.

FIG. 6 is a cross-sectional view schematically illustrating an electrical potential of each of the display electrode 12 and the slit electrode 19 and locations of the black particles 61 when the electrophoretic display 1 causes each of the pixels 20a to display white color. FIG. 7 is a cross-sectional view schematically illustrating an electrical potential of each of the display electrode 12 and the slit electrode 19 and locations of the black particles 61 when the electrophoretic display 1 causes each of the pixels 20a to display black color.

As shown in FIG. 6, when the display electrode 12 is supplied with image signal of high-level (H), and further, the slit electrode 19 is supplied with an inverted image signal of low-level (L), a plurality of positively-charged black particles 61 moves to the slit electrode 19 side because of electrical powers (coulomb forces) caused by electrical fields arising between the display electrode 12 and the slit electrode 19, and is contained in the slit 90. As a result, very few (or none) of the black particles 61 overlap (overlaps) the white reflection plate 13 when seen in a plan view from above the circuit substrate 10 (refer to FIGS. 1 and 2), thereby enabling the white reflection plate 13 to reflect light rays with certainty. Accordingly, white color can be displayed at each of the pixels 20a.

In contrast, as shown in FIG. 7, when the display electrode 12 is supplied with an image signal of low level (L), and further, the slit electrode 19 is supplied with an inverted image signal of high level (H), a plurality of positively-charged black particles 61 moves to the display electrode 12 side because of electrical powers caused by electrical fields arising between the display electrode 12 and the slit electrode 19, and is disposed so as to cover the white reflection plate 13 on the display electrode 12. Accordingly, black colors of the plurality of black particles 61 can be displayed at each of the pixels 20a.

According to this embodiment, as have been described with reference to FIG. 2, both of the display electrode 12 and the slit electrode 19 are provided on the circuit electrode 10 (more specifically, the display electrode 12 and the slit electrode 19 are provided so as to be close to each other for each of the pixel electrodes 20e on the circuit substrate 10), and thus, it is possible to cause the black particles 61 to move in a space between the display electrode 12 and the slit electrode 19, even though the level of a voltage to be supplied between the display electrode 12 and the slit electrode 19 is relatively small. Accordingly, the level of a voltage to be supplied between the display electrode 12 and the slit electrode 19 can be made relatively small.

Moreover, according to this embodiment, only one kind of electrophoretic particles, i.e., the black particles 61, are dispersed in the dispersion liquid 60, and thus, a particle concentration of the dispersion liquid 60 can be made lower than that in the case where, supposedly, the dispersion liquid 60 includes black particles and white particles dispersed therein, thereby enabling a moving speed at which the black particles 61 move in the dispersion liquid 60 (in other words, a response speed of the black particles 61 in response to supply of a voltage between the display electrode 12 and the slit electrode 19) to increase. As a result, a display speed with which display contents are updated can be increased.

In addition, according to this embodiment, white color is displayed by causing the white reflection plate 13 to reflect light rays, and thus, white color can be certainly displayed inside the display area 10a. Here, even though the black particles 61 are contained in the slit 90 which is provided between the two mutually adjacent base portions 11, the white reflection plates 13 is capable of scattering light rays in multiple directions, and thus, displaying has very few practical improper influences or no practical improper influence from the color of the black particles 61 (i.e., the black color), the improper influence being, for example, an influence causing degradation of brightness, degradation of contrast, and the like.

In this embodiment, particularly, the slit 90 has a width, a depth and the like which are adjusted so as to make the total volume of the black particles 90 corresponding to each of the display electrodes 12 (in other words, for each of the pixels 20a) be smaller than the volume of the slot 90 corresponding to each of the display electrodes 12 (in other words, for each of the pixels 20a). Therefore, when displaying white color at each of the pixels 20a, occurrence of a situation, in which all the plurality of black particles 61 cannot be contained in the slit 90, can be prevented, that is, the plurality of black particles 61 can be contained in the slit 90 with certainty.

Next, a refresh driving, which is a characteristic of the electrophoretic display 1 according to this embodiment, will be described with reference to FIGS. 8 and 9.

Figure 8:
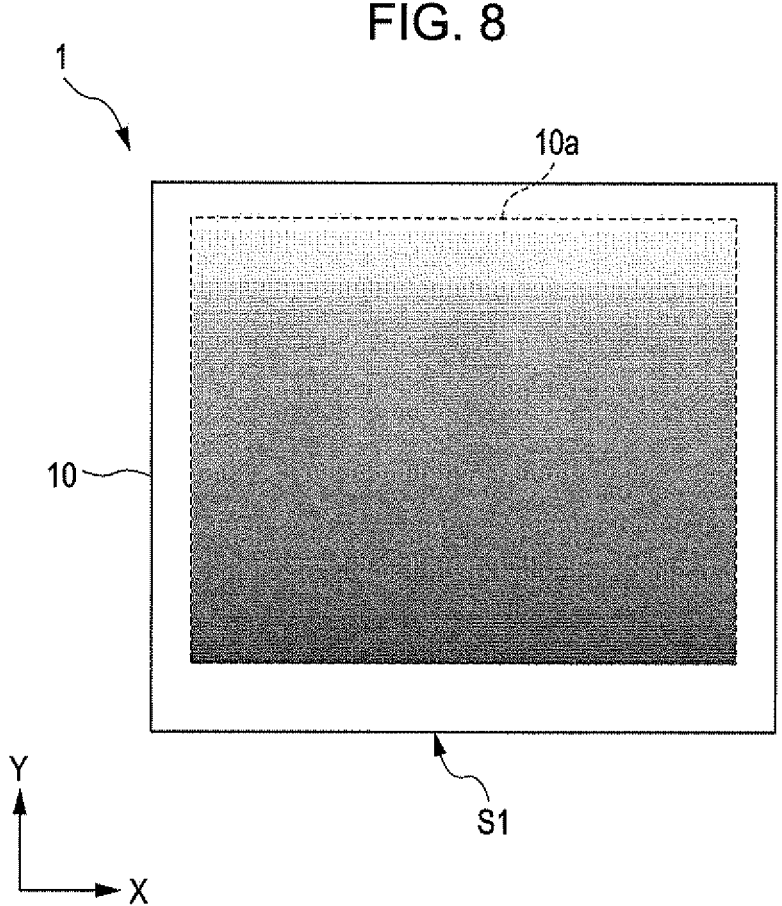
FIG. 8 is a plan view schematically illustrating an example of a display condition of a display area when a plurality of black particles is unevenly distributed around a side of a circuit substrate.

FIG. 8 is a plan view schematically illustrating an example of a display condition of the display area 10a when the plurality of black particles 61 is unevenly distributed around a side S1 of the circuit substrate 10.

As shown in FIG. 8, for example, when the electrophoretic apparatus 1 is kept in such a condition that the side S1 of the circuit substrate 1 is placed lower in a vertical direction, the plurality of black particles 61 moves to an area around the side S1 because of the force of gravity applied to the plurality of black particles 61, thereby sometimes causing a display condition in which the plurality of black particles 61 is unevenly distributed around the side 51. Further, such an uneven distribution of the plurality of black particles 61 inside the display area 10a results in visual recognition as a lack of display uniformity.

Therefore, in this embodiment, in order to eliminate this uneven distribution of the plurality of black particles 61, the following refresh driving is performed.

Figure 9:
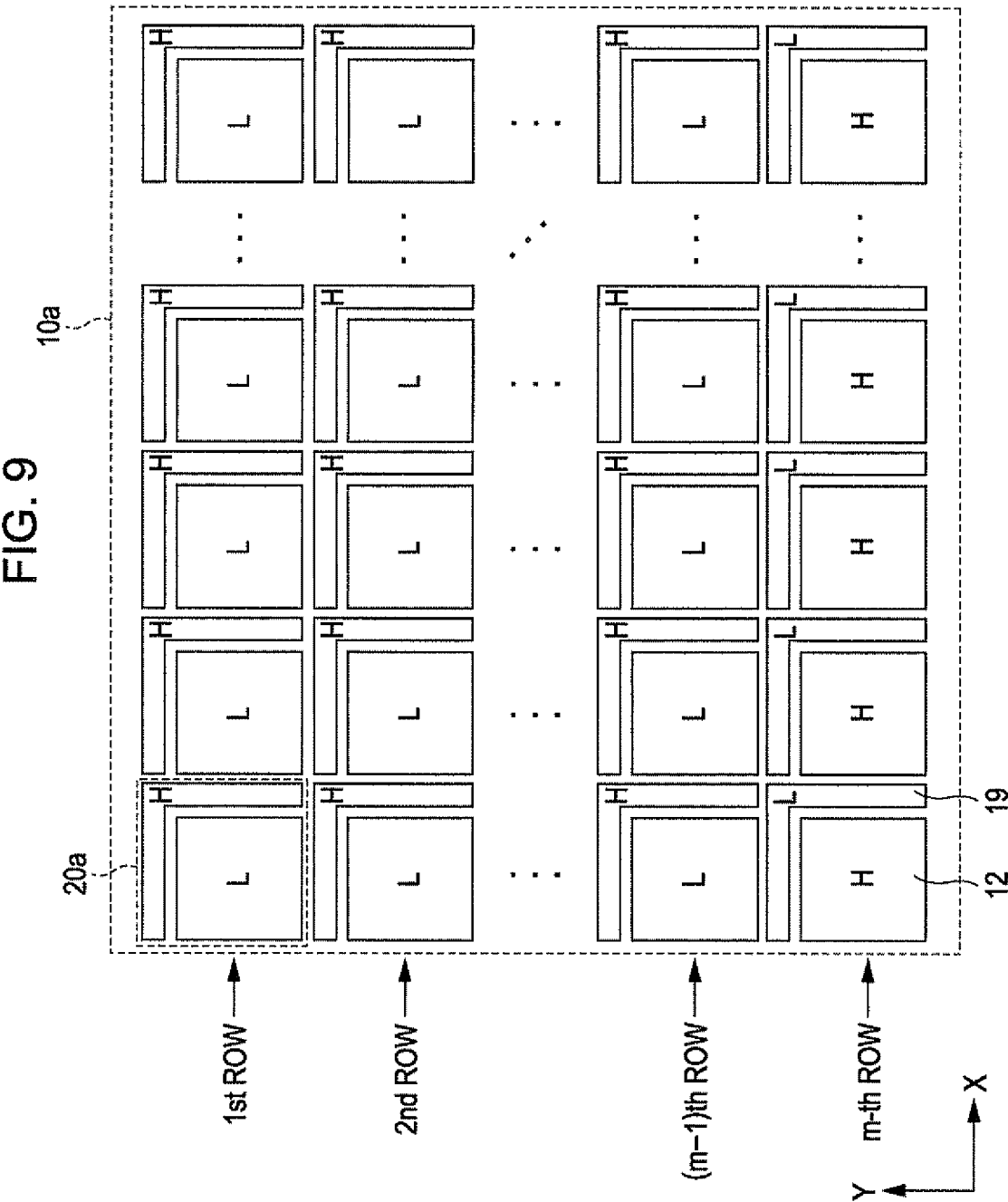
FIG. 9 is a conceptual diagram describing a refresh driving according to a first embodiment of the invention.

FIG. 9 is a conceptual diagram describing a refresh driving according to this embodiment, and illustrates an example of electrical potentials supplied to the display electrodes 12 and the slit electrodes 19 during operation of the refresh driving.

In FIG. 9, in the refresh driving, regarding the plurality of pixels 20a forming a plurality of rows each including pairs of the display electrode 12 and the slit electrode 19, the pairs being arrayed along the side S1 of the circuit substrate 10, a process, in which, for the respective pairs of the display electrode 12 and the slit electrode 19 included in at least one of the rows, voltages are supplied between the display electrodes 12 and the slit electrodes 19 so that aggregates of the black particles 61 move from the display electrode 12 sides to the slit electrode 19 sides, is iteratively performed, the at least one of the rows, for an initial process, being an initial one of the rows, which is located closest to the side S1, and for subsequent processes, being successive ones of the rows, which, for each of the subsequent processes, is increased by one row which is disposed at a position opposite to the side S1, in addition to at least one of the rows, which has been processed in an immediately previous process.

Specifically, in the refresh driving, first, the display electrodes 12 and the slit electrodes 19 corresponding to an m-th row of the pixels 20a (that is, the pixels 20a arrayed along the scanning line Ym (refer to FIG. 5)) are supplied with an electrical potential of high level (H) and an electrical potential of low level (L), respectively, and the display electrodes 12 and the slit electrodes 19 corresponding to the other pixels 20a (that is, a 1st row to an (m−1)th row of the pixels 20a) are supplied with the electrical potential of low level (L) and the electrical potential of high level (H), respectively. As a result of this operation, the plurality of black pixels 61 is contained in the slit electrodes 19 corresponding to the m-th row of the pixels 20a. Next, the display electrodes 12 and the slit electrodes 19 corresponding to each of the m-th and the (m−1)th rows of the pixels 20a (that is, the pixels 20a arrayed along each of the scanning lines Ym and Ym−1) are supplied with the electrical potential of high level (H) and the electrical potential of low level (L), respectively. Further, the display electrodes 12 and the slit electrodes 19 corresponding to the other pixels 20a (that is, the 1st row to an (m−2)th row of the pixels 20a) are supplied with the electrical potential of low level (L) and the electrical potential of high level (H), respectively. As a result of this operation, the plurality of black pixels 61 is contained in the slit electrodes 19 corresponding to the (m−1)th row of the pixels 20a, in addition to the m-th row of the pixels 20a. In the following, just like the operations described above, a row of the pixels 20a, for which the display electrodes 12 and the slit electrodes 19 are supplied with the high level (H) electrical potential and the low level (L) potential, respectively, sequentially increases from the side S1 side, and concurrently, a row of the pixels 20a, for which the display electrodes 12 and the slit electrodes 19 are supplied with the electrical potential of low level (L) and the electrical potential of high level (H), respectively, sequentially decreases, so that, finally, the display electrodes 12 and the slit electrodes 19 corresponding to all the pixels 20a are supplied with the electrical potential of high level (H) and the electrical potential of low level (L), respectively. In addition, the refresh driving is performed by causing the controller 110 to perform control of the scanning line driving circuit 120 and the data line driving circuit 130.

Such a refresh driving causes the plurality of black particles 61, which is unevenly distributed around the side S1 of the display area 10a, to, firstly, be contained in the slits 90 corresponding to the m-th row of the pixels 20a located closest to the side S1 of the circuit substrate 10, and subsequently, be sequentially contained in the slits 90 corresponding to the (m−1)th row of the pixels 20a, the slits 90 corresponding to the (m−2)th row of the pixels 20a, . . . , and the slits 90 corresponding to the 1st row of the pixels 20a. That is, the plurality of black particles 61, which is unevenly distributed around the side S1 of the display area 10a, is sequentially contained in the slits 90 from a side close to the side 81 of the display area 10a (that is, from a lower side) toward a side far from the side S1 thereof (that is, toward an upper side). Therefore, the uneven distribution of the plurality of black particles 61 inside the display area 10a can be eliminated. Namely, the plurality of black particles 61 can be evenly distributed all over the display area 10a. Accordingly, the non-uniform display can be very mostly or completely eliminated. As a result of this process, it is possible to improve display quality.

As described above, the electrophoretic display 1 according to this embodiment enables realization of high-quality display.

Second Embodiment

An electrophoretic display according to a second embodiment will be described with reference to FIG. 10.

Figure 10:
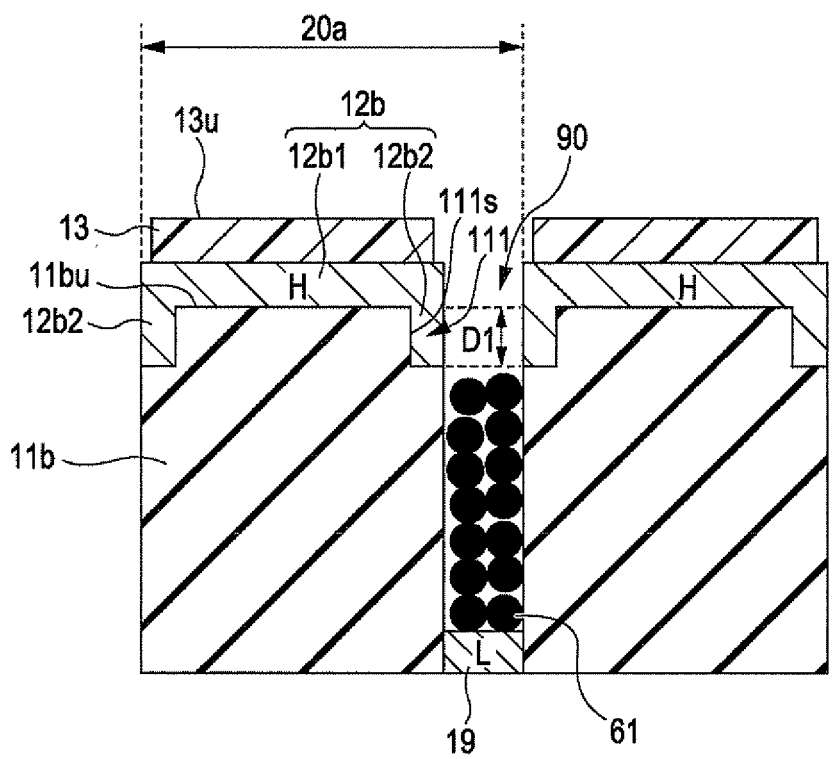
FIG. 10 is a cross-sectional view illustrating a configuration of pixels included in an electrophoretic display according to a second embodiment of the invention.

FIG. 10 is a cross-sectional view illustrating a configuration of pixels included in an electrophoretic display according to the second embodiment. In addition, in FIG. 10, configuration elements, which are the same as or equivalent to those, shown in FIGS. 1 to 9, in the first embodiment, are denoted by the same reference numbers, and descriptions thereof will be arbitrarily omitted.

In FIG. 10, an electrophoretic display according to the second embodiment includes a base portion 11b and a display electrode 12b in place of the base portion 11 and the display electrode 12 in the first embodiment 1, respectively, and, in this respect, is different from the above-described electrophoretic display 1 according to the first embodiment. In the other respects, the electrophoretic display according to the second embodiment is configured in substantially the same manner as that of the above-described electrophoretic display 1 according to the first embodiment.

As shown in FIG. 10, the base portion 11b has cutout portions 111 resulting from cutting out respective portions positioned at the slit 90 sides of the base portion 11b. The cutoff portions 111 are each cut out by a length D1 extending from an upper surface 11bu of the base portion 11b toward the circuit substrate 10 (refer to FIG. 2) side. A display electrode 12b includes a body portion 12b1 which is provided so as to be along the upper surface 11bu of the base portion 11b, and side surface portions 12b2 which are provided so as to be along side surfaces 111s of the base portion 11b, respectively. The white reflection plate 13 is provided on the body portion 12b1 of the display electrode 12b. In addition, FIG. 10 shows a condition in which the display electrode 12b and the slit electrode 19 are supplied with an image signal of high level (H) and an inverted image signal of low level (L), respectively; thereby causing the plurality of black particles 61 to be contained in the slit 90.

According to the electrophoretic display according to this second embodiment, which has been configured in such a manner as described above, it is possible to make a distance between the black particles 90 having been contained in the slit 90 and the upper surface 13u of the white reflection plate be larger than the length D1, by which each of the side surface portions 12b2 of the display electrode 12b extends along the side surface 111s of the base portion 11b. Therefore, when required to display white color (that is, the color of the white reflection plate 13), it is possible to reduce or prevent occurrence of a situation in which, as a result, the color of the black particles 61 (i.e., the black color) is exposed to be viewed. Here, for example, repulsive forces occur between the side surface portion 12b2 of the display electrode 12 supplied with an image signal of high-level (H), and the black particles 61 (i.e., positively-charged black-color electrophoretic particles) contained in the slit 90, and this repulsive forces enable reduction or prevention of movement of the black particles 61 toward the white reflection plate 13 side (in other words, toward the body portion 12b1 side of the display electrode 12b).

As a result, the electrophoretic display according to this second embodiment enables realization of further high-quality display.

Third Embodiment

An electrophoretic display according to a third embodiment will be hereinafter described with reference to FIG. 11.

Figure 11:
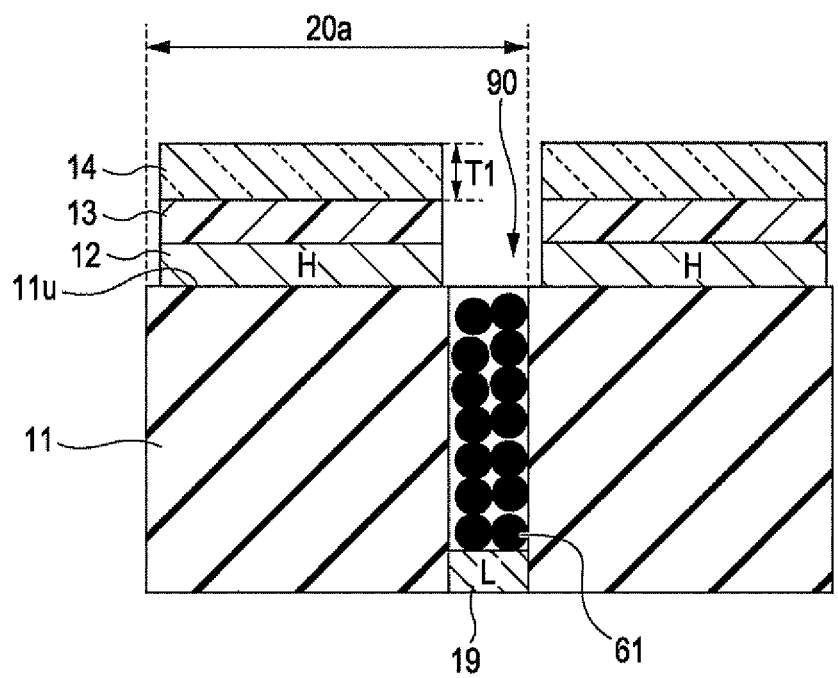
FIG. 11 is a cross-sectional view illustrating a configuration of pixels included in an electrophoretic display according to a third embodiment of the invention.

FIG. 11 is a cross-sectional view illustrating a configuration of pixels included in an electrophoretic display according to this third embodiment. In addition, in FIG. 11, configuration elements which are the same as or equivalent to those, shown in FIGS. 1 to 9, in the first embodiment are denoted by the same reference numbers, and descriptions thereof will be arbitrarily omitted.

In FIG. 11, an electrophoretic display according to this third embodiment further includes an adjustment film 14, and, in this respect, is different from the above-described electrophoretic display 1 according to the first embodiment. In the other respects, the electrophoretic display according to this third embodiment is configured in substantially the same manner as that of the above-described electrophoretic display 1 according to the first embodiment.

As shown in FIG. 11, the adjustment film 14 is provided on the white reflection plate 13. The adjustment film 14, which is formed of a transparent material, such as a transparent resign, is provided so as to overlap the entire white reflection plate 13, and has a predetermined film thickness T1. Therefore, compared with an assumed case in which the adjustment film 14 is not provided on the white reflection plate 13, since the depth of the slit 90 can be made larger by the film thickness T1 of the adjustment film 14 (in other words, since a distance between the upper surface 11u of the base portion 11 and the uppermost surface of a laminated layer structure stacked on the base portion 11 can be made larger by the film thickness T1 of the adjustment film 14), it is possible to reduce or prevent occurrence of a situation in which the black particles 61 required to be contained in the slit 90 result in movement to positions covering the white reflection plate 13 when seen in a plan view from above the circuit substrate 10. Thus, in the case where white color (i.e., the color of the white reflection plate 14) is required to be displayed, it is possible to reduce or prevent occurrence of a situation in which, as a result, the color of the black particles (i.e., the black color) is exposed to be viewed.

As a result, the electrophoretic display according to this third embodiment enables realization of further high-quality display.

Fourth Embodiment

An electrophoretic display according to a fourth embodiment will be hereinafter described with reference to FIG. 12.

Figure 12:
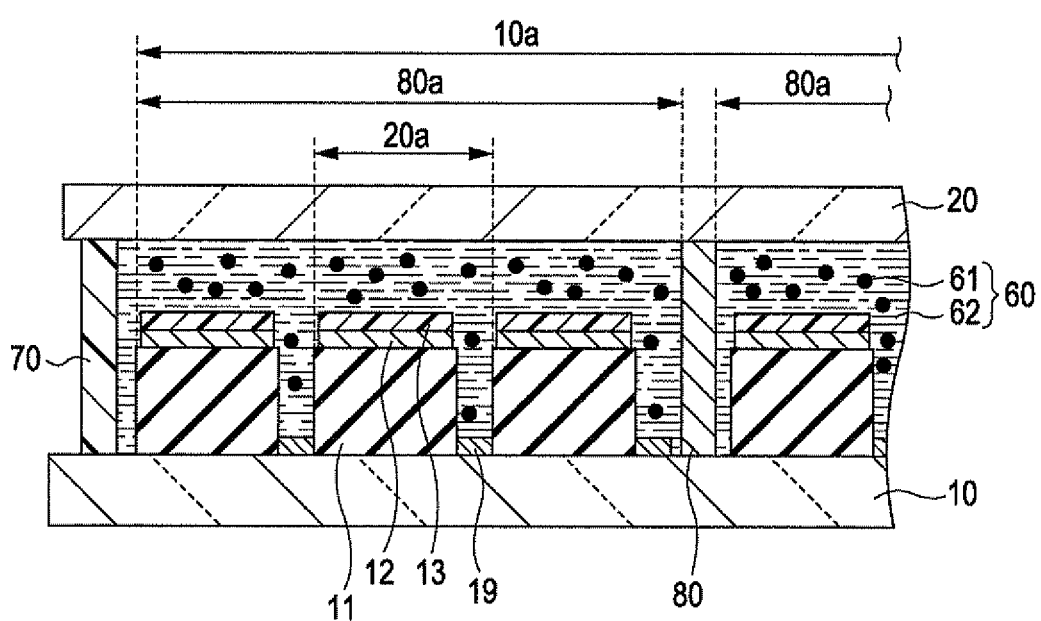
FIG. 12 is a cross-sectional view illustrating a configuration of an electrophoretic display according to a fourth embodiment of the invention.

FIG. 12 is a cross-sectional view illustrating a configuration of an electrophoretic display according to this fourth embodiment. In addition, in FIG. 12, configuration elements which are the same as or equivalent to those, shown in FIGS. 1 to 9, in the first embodiment are denoted by the same reference numbers, and descriptions thereof will be arbitrarily omitted.

In FIG. 12, an electrophoretic display according to this fourth embodiment further includes a partition wall 80, and, in this respect, is different from the above-described electrophoretic display 1 according to the first embodiment. In the other respects, the electrophoretic display according to this fourth embodiment is configured in substantially the same manner as that of the above-described electrophoretic display 1 according to the first embodiment.

As shown in FIG. 12, the partition wall 80 is provided between the circuit substrate 10 and the opposing substrate 20 so as to partition the display area 10*a* into a plurality of areas 80*a*. The partition wall 80 has, for example, a lattice-like planar shape.

According to this fourth embodiment, since the partition wall 80 is provided between the circuit substrate 10 and the opposing substrate 20, it is possible to increase strength against pressure applied from, for example, the circuit substrate 10 side and/or the opposing substrate 20 side.

Here, in this fourth embodiment, particularly, a plurality of the display electrodes 12 is included in each of the plurality of areas 80*a* partitioned by the partition wall 80 (in other words, a plurality of the pixels 20*a* is included therein). Therefore, compared with an assumed case in which the partition wall 80 is provided so as to enclose each of the pixels 20*a*, an area which is occupied by the partition wall 80 (in other words, an area not contributing to displaying) inside the display area 10*a* can be made smaller, and thus, it is possible to realize bright and high-contrast display.

Electronics Device

Next, electronics devices to which the above-described electrophoretic display is applied will be described with reference to FIGS. 13 and 14. Hereinafter, examples, in which the above-described electrophoretic display is applied to electronic paper and an electronic notebook, will be described.

Figure 13:
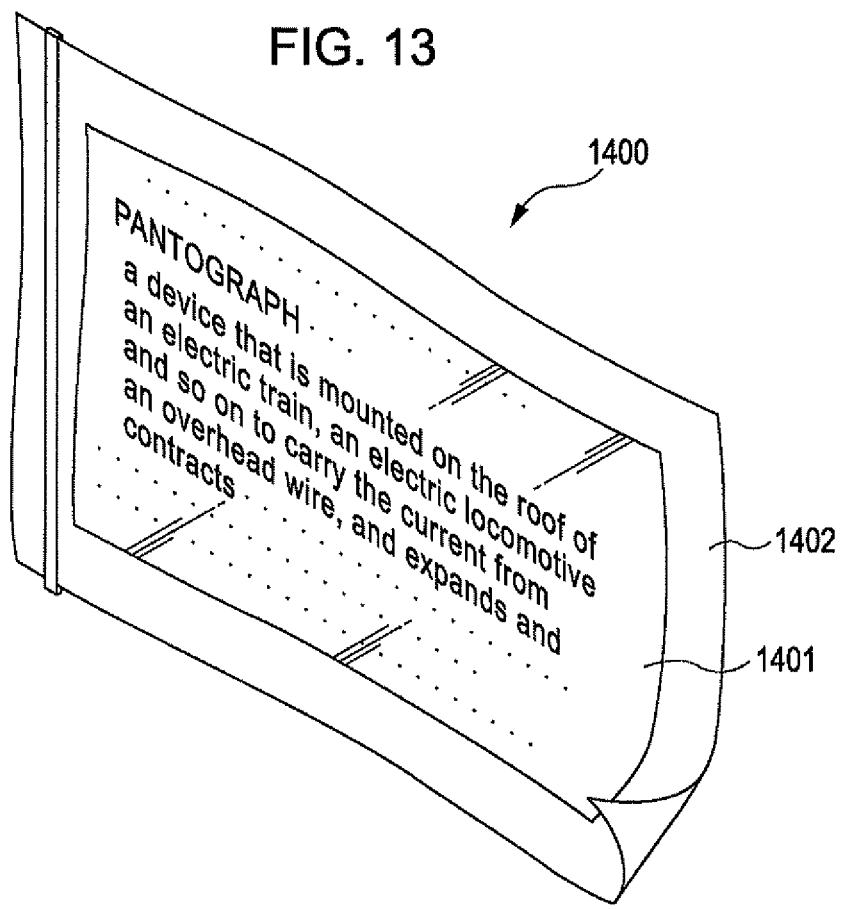
FIG. 13 is a perspective view illustrating a configuration of electronic paper as an example of an electronics device to which anyone of electrophoretic displays according to embodiments of the invention is applied.

Referring to FIG. 13, which is a perspective view illustrating a configuration of electronic paper 1400, the electronic paper 1400 includes an electrophoretic display according to any of the above-described embodiments as a display unit 1401. The electronic paper 1400 has a flexibility, and includes a body 1402 formed of a rewritable sheet having texture and bendability just like those of a sheet of existing general paper.

Figure 14:
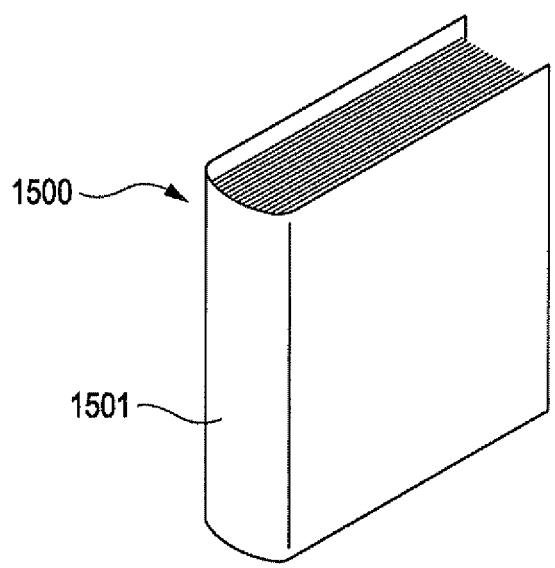
FIG. 14 is a perspective view illustrating a configuration of an electronic notebook as an example of an electronics device to which anyone of electrophoretic displays according to embodiments of the invention is applied.

Referring to FIG. 14, which is a perspective view illustrating a configuration of an electronic notebook 1500, the electronic notebook 1500 is an electronics device in which a plurality of sheets of the electronic paper 1400 shown in FIG. 13 is bundled, and is bound by a cover 1501. The cover 1501 includes, for example, an input display data reception means (not illustrated) for receiving input display data having been transmitted from external devices. By utilizing such an input display data reception means, it is possible to change or update display contents in accordance with input display data corresponding thereto under the condition in which the sheets of the electronic paper remain bundled.

Each of the above-described electronic paper 1400 and electronic notebook 1500 includes an electrophoretic display according to any of the above-described embodiments, and thus, enables realization of high-quality image display.

It is to be noted that the invention is not limited to the above-described embodiments, but, can be arbitrarily modified within the scope not departing from the gist or concept of the invention, which is readable from the appended claims and/or the whole of this patent document regarding the invention, and any electrophoretic display including such a modification and any electronics device configured to include the electrophoretic display are also included in the technical scope of the invention.

The entire disclosure of Japanese Patent Application No. 2010-248727, filed Nov. 5, 2010 is expressly incorporated by reference herein.

What is claimed is:

1. An electrophoretic display, comprising:
a first substrate and a second substrate which are disposed opposite each other;
base portions which are provided in a display area on the first substrate such that any two mutually adjacent ones of the base portions are disposed so as to have an interspace therebetween;
reflection plates which are provided on upper surfaces of the base portions, respectively;
first electrodes which are overlapped with the reflection plates in plan view, respectively;
second electrodes which are provided in the interspaces on the first substrate so as to correspond to the first electrodes, respectively;
a sealing member which is provided between the first substrate and the second substrate so as to enclose the display area; and
dispersion liquid which is provided in the display area between the first substrate and the second substrate, and which includes a dispersion medium, and electrophoretic particles dispersed in the dispersion medium, the electrophoretic particles having a color which is different from a color of the reflection plate.

2. The electrophoretic display according to claim 1, further comprising:
a driving unit configured to perform a refresh driving such that, regarding the first and second electrodes, which form a plurality of rows each including pairs of the first electrode and the second electrode, the pairs being arrayed along a side of the first substrate, a process, in which, for the respective pairs of the first electrode and the second electrode included in at least one of the rows, voltages are supplied between the first electrodes and the second electrodes so that the electrophoretic particles move from first electrode sides to second electrode sides, is iteratively performed, the at least one of the rows, for an initial process, being an initial one of the rows, which is located closest to the side of the first substrate, and for subsequent processes, being successive ones of the rows, which, for each of the subsequent processes, is increased by one row which is disposed at a position opposite to the side of the first substrate, in addition to at least one of the rows, which has been processed in an immediately previous process.

3. An electronics device comprising the electrophoretic display according to claim 2.

4. The electrophoretic display according to claim 1, wherein the first electrode includes a body portion which is provided so as to be along an upper surface of the base portion, and a side portion which is provided so as to extend from the body portion toward the first substrate along a side surface of the base portion, and the reflection plate is provided on the body portion.

5. An electronics device comprising the electrophoretic display according to claim 4.

6. The electrophoretic display according to claim 1, wherein the reflection plate is provided on the first electrode, and an adjustment film formed of a transparent material is provided on the reflection plate.

7. An electronics device comprising the electrophoretic display according to claim 6.

8. The electrophoretic display according to claim 1, wherein a total volume of the electrophoretic particles corresponding to the first electrode is smaller than a volume of the interspace corresponding to the first electrode.

9. An electronics device comprising the electrophoretic display according to claim 8.

10. The electrophoretic display according to claim 1, further comprising:

a partition wall which is provided between the first substrate and the second substrate, and which partitions the display area into a plurality of areas, each including a group of the first electrodes.

11. An electronics device comprising the electrophoretic display according to claim 10.

12. An electronics device comprising the electrophoretic display according to claim 1.

* * * * *